No. 780,545.

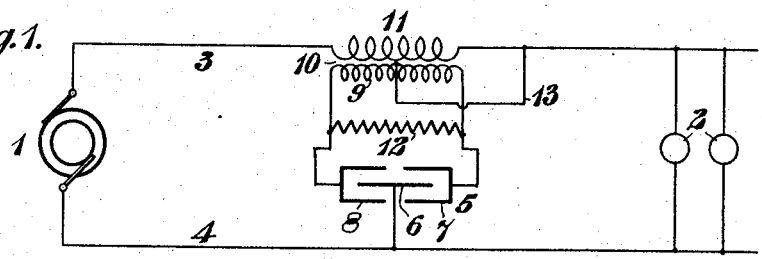
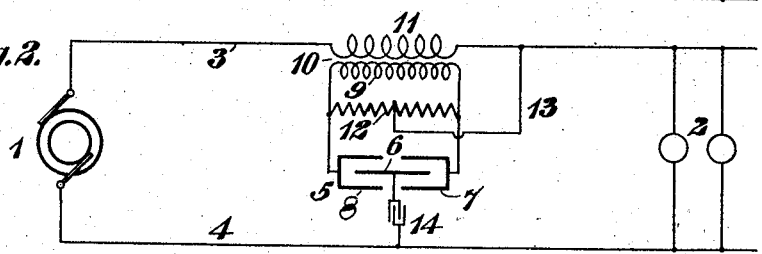
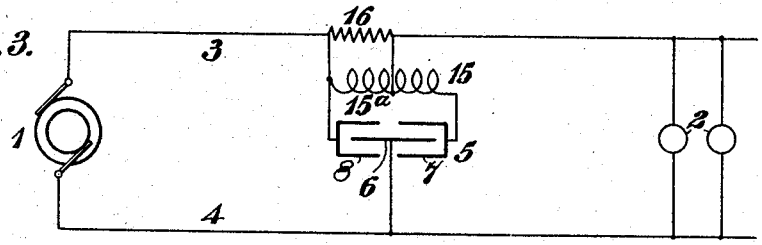
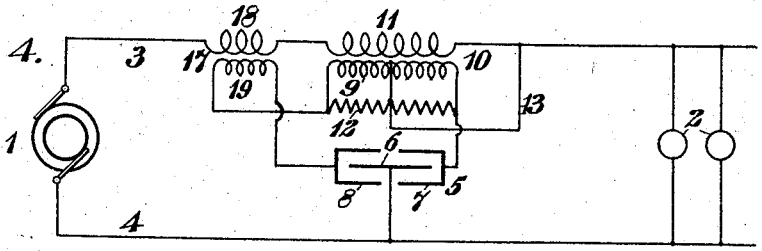
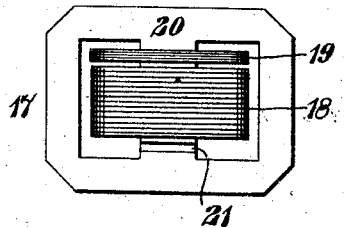
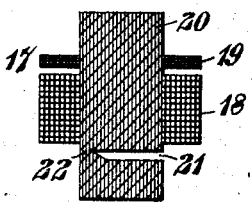

Patented January 24, 1905.

UNITED STATES PATENT OFFICE.

MILES WALKER, OF WILKINSBURG, PENNSYLVANIA, ASSIGNOR TO WESTINGHOUSE ELECTRIC & MANUFACTURING COMPANY, A CORPORATION OF PENNSYLVANIA.

MEANS FOR MEASURING THE ENERGY OF ALTERNATING-CURRENT CIRCUITS.

SPECIFICATION forming part of Letters Patent No. 780,545, dated January 24, 1905.

Application filed February 28, 1903. Serial No. 145,618.

*To all whom it may concern:*

Be it known that I, MILES WALKER, a subject of the King of Great Britain, residing at Wilkinsburg, in the county of Allegheny and State of Pennsylvania, have invented a new and useful Improvement in Means for Measuring the Energy of Alternating - Current Circuits, of which the following is a specification.

My invention relates to the measurement of the energy of alternating-current circuits; and it has for its object to provide a comparatively simple and inexpensive means which may be readily adapted to a wide range of voltages in such manner as to secure accurate results without the waste of any considerable amount of energy in the apparatus.

The wattmeter which I propose to use is of the electrostatic type, sometimes designated as a quadrant electrometer, the essential characteristics of which are set forth in the published transactions of the Royal Society of the year 1891, Vol. 182, page 519. Instruments of this character have not been heretofore generally used, because the forces which act upon the needle or movable member of the instrument when the instrument is connected up in accordance with the ordinary method are so small as to necessitate the employment of an instrument which is extremely delicate and sensitive. Under the ordinary practice the voltage which is applied to the quadrants of the instrument is secured by passing the main current through a non-inductive resistance, and this necessitates the utilization of a low voltage in the instrument in order to avoid a large loss of power in the non-inductive resistance which would otherwise result. Furthermore, with the usual arrangement an error is introduced into the reading of the instrument which is proportional to the square of the voltage. The connections employed by me insure a voltage between the quadrants that is larger than the voltage hitherto employed, so that comparatively large forces may be utilized in the instrument and the objections to the use of large voltages which are above referred to are entirely eliminated.

In the accompanying drawings, which illustrate my invention, Figures 1, 2, and 3 are diagrams illustrating three arrangements of apparatus in accordance with my invention. Fig. 4 is a similar diagram, but embodies in addition a compensating transformer. Figs. 5 and 6 are views, respectively, in side elevation and in section, of the compensating transformer illustrated diagrammatically in Fig 4.

In Fig. 1 I have shown an alternating-current generator 1 as supplying energy to one or more translating devices 2 through conductors 3 and 4, and in order to measure the energy of the circuit 3 4 I employ an electrostatic wattmeter 5, the needle or movable member 6 of which is connected directly to the side 4 of the circuit and the quadrants or stationary members 7 and 8 of which are connected to the respective terminals of a non-inductive resistance 12. The non-inductive resistance is connected to the secondary winding 9 of a transformer 10, the primary winding 11 of which is included in the conductor 3 in series between the generator 1 and the translating device or devices 2. A non-inductive resistance 12 is thus connected in shunt relation to the terminals of the transformer-secondary 9 and also to the quadrants 7 and 8, and the middle point of the secondary 9 is connected to the conductor 3 by a conductor 13. The ratio of transformation in the transformer 10 depends somewhat upon the nature of the circuit, as does also the number of ohms represented by the non-inductive resistance 12, the latter being also dependent upon the constant of the instrument. The main object to keep in view in fixing the particular values of resistance and transformation ratio is to obtain sufficient voltage at the terminals of the resistance and yet to avoid any considerable loss. The greater the ratio of transformation the less will be the loss; but the ratio of transformation should be kept within reasonable limits or the magnetizing-current in the transformer will form too large a fraction of the whole current.

In Fig. 2 the several parts of the apparatus and their circuit connections are the same as I have shown in Fig. 1, except that I have shown the non-inductive resistance 12 as having its middle point connected to the conductor 3. I have also shown in this figure a condenser 14 interposed between the needle or movable member 6 of the wattmeter and the conductor 4, this device being provided in order to adapt the apparatus to exceptionally high voltages, and if the condenser is so made that its capacity may be changed the constant of the instrument may be thereby adjusted.

In Fig. 3 I have shown an autotransformer 15 in lieu of the two-coil transformer, (shown in Figs. 1 and 2,) the primary portion $15^a$ of which is substantially one-half of its length, and a non-inductive resistance 16 is connected in shunt to this primary portion of the transformer. The entire length of the transformer-winding, which constitutes the secondary, is connected to the stationary members or quadrants 7 and 8 of the wattmeter 5 in the same manner as is indicated in the preceding figures. This form of my invention while differing somewhat in its structural features is substantially the same as regards ratio of circuits and operation as those shown in the other figures.

Referring now to Figs. 4, 5, and 6, the several parts shown in Figs. 1 and 2 are reproduced in Fig. 4, except that the middle points of the transformer-secondary 9 and of the non-inductive resistance 12 are connected together and to the conductor 3. In addition to these features I here employ a compensating transformer 17, the primary winding 18 of which is in series with the primary winding 11 of the transformer 10 and the secondary winding 19 of which is connected in series between the secondary 9 and the quadrant 8 of the wattmeter 5.

Since the middle point of the secondary 9 and that of the resistance 12 are of the same potential, either or both of these points may be connected to the conductor 3 in each of the modifications shown in Figs. 1, 2, and 4.

While I have shown the middle point of the transformer-secondary 9 and the middle point of the non-inductive resistance 12, or one of them, as connected to the conductor 3 and the needle or movable member 6 of the wattmeter as connected to the conductor 4 in each of Figs. 1, 2, 3, and 4, it will be understood that a reversal of these connections is equally operative and within the scope of my invention.

In Figs. 5 and 6 I have shown in detail the structural features of the compensating transformer 17, it being composed of a laminated core 20 and the primary and secondary windings 18 and 19, already referred to. The secondary winding 19 of the compensating transformer consists of a few turns of fine wire and occupies a small amount of space. The primary winding 18 consists of a few turns of wire or strap-copper sufficiently large to carry the main current. The object of the transformer 17 is to generate in the secondary winding a small electromotive force which shall be proportional to and in phase with the magnetizing-current flowing in the primary winding 11 of the transformer 10 at all ranges of load from a small fraction of full load to full load on the transformer 10. In order to make the matter clear, we will assume that the transformation ratio of transformer 10 is the ratio one to one. As is well known, in the operation of a series transformer (designed to take a small magnetizing current) the secondary of which is closed on a non-inductive resistance a current flows through the non-inductive resistance, which is almost in phase with the current in the primary. There is, however, a difference of phase between the primary and secondary currents, owing to the fact that the primary current besides having a component equal to the secondary current must also have a component at right angles in phase to the secondary current, that component being required to magnetize the core of the transformer. This component of the primary current, which is at right angles to the secondary current, is here called the "magnetizing-current" of transformer 10. For the purpose of adjusting the compensating transformer 17 it is desirable to measure the magnetizing-current of transformer 10 under all operating conditions of load. This current may then be plotted in a curve, taking the main curve through the winding 11 as abscissæ. For example, let the magnetizing-current of transformer 10 be $c$ amperes of a certain frequency when the load of transformer 10 is $C$ amperes. Let the voltage across the resistance 12 be represented by V when the main current C passes through the winding 11. In the natural operation of the transformer the magnetizing-current $c$ is subtracted from the current C so far as effect on the secondary line of the transformer is concerned, so that the voltage V, which is in phase with the secondary current, is not strictly in phase with the current C. All that is necessary to correct this is to provide a small electromotive force in the winding 19, so that it adds the small voltage $v$ to the larger voltage V, thus making $V+v$ very nearly in phase with the current C. What is required of the compensating transformer is to generate in the secondary 19 a small voltage $v$, such that $\dfrac{c}{C}=\dfrac{v}{V+v}$. The current $c$ should be as nearly as possible in phase with the voltage $v$. In order to insure the performance of the desired function by the compensating transformer, it may be provided with an air-gap 21, so that a considerable magnetizing-current in transformer 17 is required. The main current C is the magnetizing-current in the compensating transformer 17, because there is no load on the secondary. The magnetizing-current $c$ of the transformer 10 is nearly ninety degrees behind the current C, and the voltage $v$ is also nearly ninety degrees behind the voltage V, so that the current $c$ and the voltage $v$ are very nearly in phase. The quantity of iron and copper and the number of turns for the transformer 17 are so chosen as to provide the desired voltage $v$ in accordance with methods well known in the art. If the current $c$ is proportional to the current C, an ordinary air-gap is all that is required. In general the current $c$ will not be exactly proportional to the current C. In such case it is desirable to partially short-circuit the air-gap 21 with a few laminæ of iron, as indicated at 22 in Fig. 6, the result being that when the current C is small and the iron not saturated the voltage $v$ may be larger in proportion. It is thus comparatively easy by experiment to adjust the amount of iron which short-circuits the air-gap so that the voltage $v$ follows a law very closely resembling the law of the current $c$.

In each of the forms of circuit connections shown the one side of the distributing-circuit or one terminal of the translating device receiving energy from the source, as will be seen, is connected to a point in either the main transformer-secondary or the non-inductive resistance in shunt thereto which is midway in potential between the quadrants of the wattmeter, and consequently the error ordinarily produced by a high voltage between the quadrants is eliminated.

I claim as my invention—

1. The combination with a source of alternating currents and a translating device supplied thereby, of a transformer having its primary winding in series between the source of current and the translating device, a static wattmeter having its quadrants connected to the terminals of the transformer-secondary, a non-inductive resistance having its terminals connected to the terminals of the transformer-secondary and circuit connections between the respective terminals of the translating device and the needle of the wattmeter and a point having the same potential as the non-inductive resistance.

2. Means for measuring the energy of alternating-current circuits, comprising an electrostatic wattmeter having its movable member connected to one side of the circuit, a series transformer in the other side of the circuit having its secondary terminals connected to the quadrants of the wattmeter and a non-inductive resistance having its terminals connected to those of the transformer-secondary and having its middle point connected to the main circuit between the transformer and the translating device.

3. In an alternating-current circuit, the combination with a series transformer and a non-inductive resistance, of an electrostatic wattmeter having its stationary members connected to the terminals of the non-inductive resistance and the transformer-secondary and having its movable member connected to the opposite side of the main circuit and a connection between the transformer side of the main circuit and one or more points in the apparatus which have the same potential as the middle point of the non-inductive resistance.

4. In an alternating-current circuit, an electrostatic wattmeter connected in circuit through a series transformer and a non-inductive resistance.

5. In an alternating-current circuit, an electrostatic wattmeter having its movable member connected to one side of the circuit and a transformer and non-inductive resistance interposed between the stationary members of the wattmeter and the other side of the circuit.

6. The combination with an alternating-current circuit, of an electrostatic wattmeter having its needle or movable member connected to one side of said circuit, a transformer having a winding connected by its middle point to the other side of said circuit and by its ends to the quadrants or stationary members of the wattmeter and a non-inductive resistance connected in shunt to said transformer-winding.

7. The combination with an alternating-current circuit and an electrostatic wattmeter for measuring its energy, of a transformer and non-inductive resistance interposed between the wattmeter and one side of said circuit and a condenser between the same and the other side of the circuit.

8. The combination with an alternating-current circuit and an electrostatic wattmeter for measuring its energy having its movable member connected to one side of the circuit, of a transformer and a non-inductive resistance having end connections to the quadrants of the wattmeter and a connection between the transformer side of the main circuit and one or more points in the apparatus having the same potential as the middle point of the non-inductive resistance.

9. The combination with an alternating-current circuit and an electrostatic wattmeter having its movable member connected to said circuit, of a transformer having its primary winding in the other side of said circuit and the terminals of its secondary winding connected to the stationary members of the wattmeter and a non-inductive resistance in shunt relation to said secondary winding, and a connection between the main circuit and one or more points in the apparatus having the same potential as the middle point of the non-inductive resistance.

10. The combination with an alternating-current circuit and an electrostatic wattmeter for measuring its energy, of a series transformer having its primary in said circuit, a non-inductive resistance in shunt to the transformer-secondary and a compensating transformer having its primary also in said circuit and having its secondary connected in series between the first transformer-secondary and a stationary member of the wattmeter, the non-inductive resistance and the first transformer-secondary being connected to another stationary member of the wattmeter and a connection between the main circuit and one or more points having the same potential as the middle point of the non-inductive resistance.

11. A compensating transformer having a core provided with a partially short-circuited but permanent air-gap.

12. A compensating transformer having a core provided with an air-gap and with non-adjustable means for partially and permanently short-circuiting said gap.

13. A compensating transformer having a laminated core provided with an air-gap, some of the laminæ being of such form and dimensions as to partially short-circuit said gap.

14. A compensating transformer having a core provided with an air-gap that extends nearly through the core but is partially short-circuited by certain of the laminæ.

In testimony whereof I have hereunto subscribed my name this 25th day of February, 1903.

MILES WALKER.

Witnesses:
 JAMES B. YOUNG,
 BIRNEY HINES.